Aug. 12, 1958    J. D. HILL    2,846,684
REMOVABLE LENS GOGGLES
Filed Dec. 15, 1952
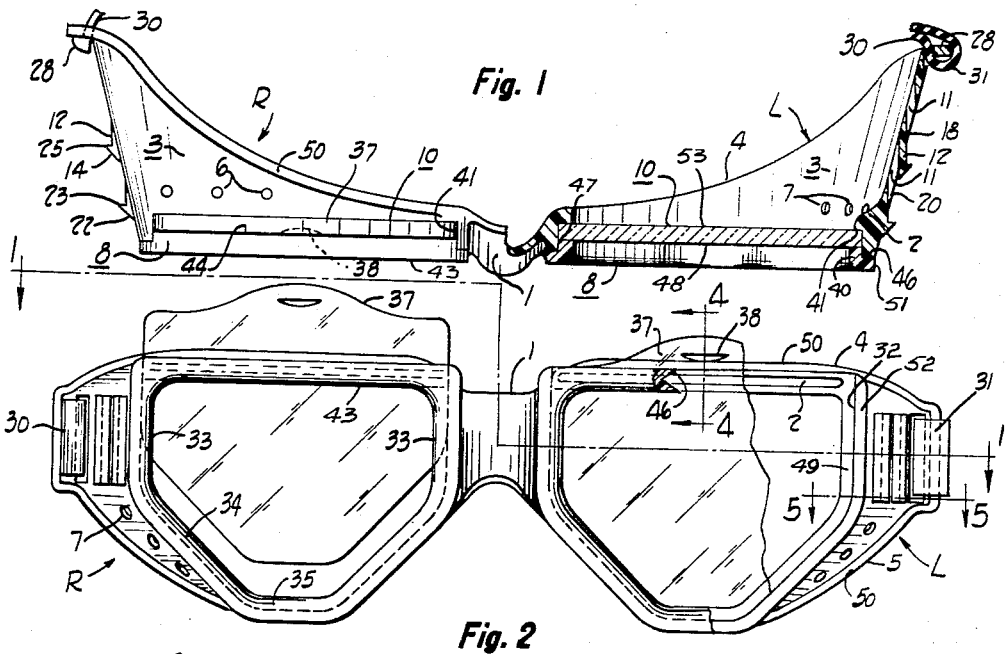
Fig. 1
Fig. 2
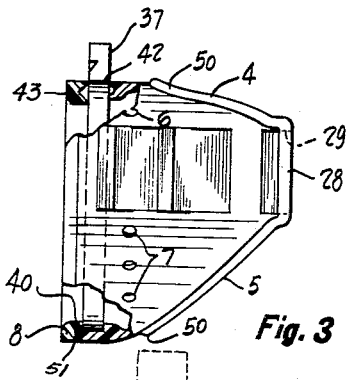
Fig. 3
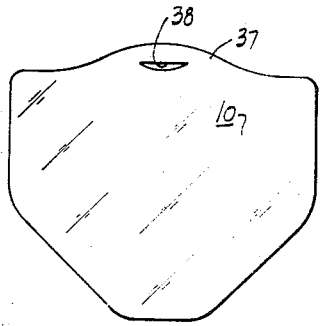
Fig. 6
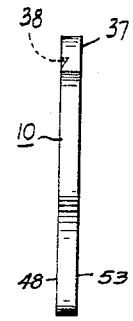
Fig. 7
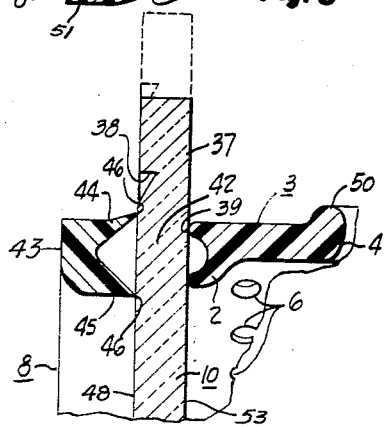
Fig. 4
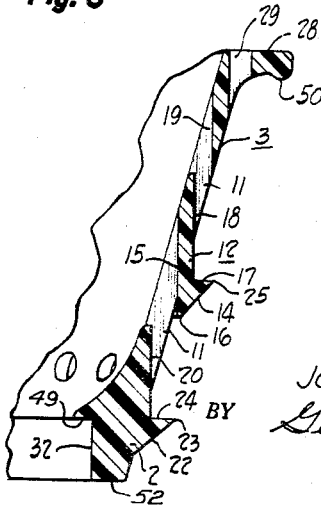
Fig. 5
INVENTOR.
JOHN D. HILL
BY George Knowles
ATTORNEY

United States Patent Office 2,846,684
Patented Aug. 12, 1958

2,846,684

REMOVABLE LENS GOGGLES

John D. Hill, Rocky River, Ohio

Application December 15, 1952, Serial No. 326,099

12 Claims. (Cl. 2—14)

This invention relates to spectacles and goggles for the eyes, more particularly to goggles having removable lenses or ventilated eye shields, or both removable lenses and ventilated shields.

Increasing recognition is being given to the importance of eye protection not only in industry but in farming, sports and other activities where injury to the eyes is possible from foreign particles such as grit, dirt, dust and the like, and from various elements such as irritating liquids and light, suitable tinting of the lenses being resorted to for protection against light rays, as is well known. Goggles of the type to which this invention relates are worn to advantage by persons seeking such protection.

There has, however, been a reluctance on the part of many people to wear conventional goggles as a protective measure because of various factors. Besides the objections to weight and discomfort, there are complaints that ordinary goggles must be removed for cleaning of the lenses, such lens cleaning is awkward and time consuming, and the wearer or user must carry or provide a suitable cloth or the like with which to do the cleansing. There are also objections that the ventilating openings or louvers in the shielded type of goggles are either so small that ventilation is inadequate and the lenses become fogged or are so large that excessive amounts of dirt and dust enter the spaces behind the lenses.

One of the principal objectives of the present invention is to provide a generally improved goggle construction aimed at overcoming the objections referred to, especially to provide a pair of goggles suitable for fabrication as by molding out of conventional plastics and resins. More particularly it is sought to provide a goggle construction which includes eye shields and removable lenses, the latter being easily withdrawn and replaced from and in the goggle frames as for cleaning or in the event of cracking or scratching in use.

In effecting the above objective and the more general objective of providing improved all-plastic goggles that can be economically manufactured in quantity, the present invention provides other features such as advantages of construction and arrangements of parts. One such feature is built-in lens wiping action obtained as by a wiping element or elements that may be integral with one of the cross elements of the eye ring or frame of the goggles. Other features are an exposed finger grip on each of the individual lenses of the goggles, such finger grips desirably being integral with the lenses and protruding above the tops of the eye ring frames as through transverse slots in the latter; vent openings and louver construction for the side shields or eye shades of the goggles which provide increased strength and better ventilation for the spaces behind the lenses and which facilitate the economical molding of the goggles in simple molds; a combination eye ring construction employing relatively stiff and relatively soft plastics for cooperating parts of the eye rings, the stiff plastic engaging one side, say the outside, of the lense margin while the soft plastic engages the other side, say the inside, of the lens margin. In this combination of relatively stiff and soft plastics the soft plastic is extended rearwardly from the relatively thick sectioned frame ring in the form of a relatively thin sectioned integral eye shield having a deformable and preferably beaded edge for contacting with and conformance to the contours of the wearer's face.

Other objects and advantages pertaining to certain novel features obtaining simplicity in manufacture, assembly, use and service will become apparent from the following detailed description of a preferred embodiment of the invention. This description is made in connection with the accompanying drawing forming a part of the specification.

In the drawings:

Figure 1 is a top plan view, partly in section and with parts broken away and removed, of a pair of goggles embodying the principles of the present invention, this view being taken substantially along the line indicated at 1—1 of Fig. 2;

Fig. 2 is a front view of the goggles with parts broken away and removed;

Fig. 3 is a side view of the goggles, partly in section and with parts broken away and removed, the headband also being removed in this view;

Fig. 4 is a fragmentary sectional detail through the upper portion of one of the lens frames showing the wiping action on the lens of the tapered edges of the top frame member upon removal and replacement of the lens, this view being taken substantially along the line indicated at 4—4 of Fig. 2 and enlarged with respect to that figure;

Fig. 5 is a fragmentary sectional detail through one of the side shields of the goggles, this view being taken substantially along the line indicated at 5—5 of Fig. 2 and enlarged with respect to that figure;

Figs. 6 and 7 are front and side views, respectively, of one of the transparent lenses showing the lens removed from the goggle.

The goggles of the present invention are made as by injection or pressure molding of conventional rubber compositions or plastics such as a relatively soft plastic or resin like polyethylene for the frames and one of the harder plastics such as the methyl methacrylic resins for the removable transparent lenses. Right- and left-hand eyepieces, R and L, respectively, are of the same general construction, being reversed duplicates of one another, and accordingly have like parts indicated by the same numerals of reference. The eyepieces are connected together by bridge or nosepiece 1 which may comprise hinged together elements carried by the two eyepieces or, as shown, may be integral with the material of the two eyepieces.

Each eyepiece comprises a relatively thick heavy sectioned eye ring preferably of composite construction and including a frame ring 2 and a retainer ring 3 to be later described. The eye ring defines the sight or opening through the corresponding eyepiece. Extending rearwardly from the eye ring and integral with the frame ring portion thereof is a shield, shade or hood 3 having curved top and bottom edges 4 and 5 contoured to accommodate the eyepiece to the anatomy of the normal wearer. The edges 4 and 5 of the extensions or shades 3 are thus received sealingly against the face about the eyes of the wearer. Top and bottom openings 6 and 7 are formed in each of the shields 3 closely adjacent the plane of lens 10 to provide ventilation for the space back of the lens.

In addition to the relatively small vent openings 6 and 7, each eyepiece side extension is formed with a plurality of vertically elongated parallel openings 11 separated by one or more louvers 12. Although a single louver 12 is illustrated, providing only a single pair of the openings 11, it is to be understood that a greater number of louvers and openings are contemplated for use in goggles having larger or longer side shields or in goggles in which it is desired to provide louver openings or slots relatively narrower than the slots 11 illustrated.

The configuration of the louvers 12 and the spaced parallel slots 11 is such as to facilitate the injection or pressure molding process by which the goggles are made so that simple molds or dies can be used, supplemental finishing and trimming operations are minimized, and full louver effect is obtained in a strong structural design.

The louver 12, and each other such louver if more than one is employed, is of substantially uniform L-section throughout its height, the outer or forward margin being formed with a surface 14 oblique or at an acute angle to inner face 15 in the provision of a vertical edge 16 which defines one side of the next forward opening 11. The forward portion of the louver 12, which carries the inclined face 14, is thicker than the body of the louver in the provision of a vertical shoulder 17 normal to the outer face or wall 18 of the louver, the face 18 generally paralleling inner face 15. The rearmost of the louver openings 11 is defined on one side by the louver wall 18 and on the other side by a flat vertical wall portion 19 of the wall of the goggle extension 3, the wall 19 substantially paralleling the outer louver wall 18.

The foremost of the openings 11 is defined by a flat vertical wall portion 20 which substantially parallels the inner wall 15 of the forwardmost of the louvers. The wall 20 is formed on the side extension or shade portion 3 of the goggle relatively close to the eye ring 2, the eye ring having a lateral extension formed with an oblique outer surface 22 forming a relatively sharp edge 23 with shoulder surface 24 that is normal or at a right angle to the louver wall surface 20 and which corresponds to the louver shoulders 17 previously mentioned. The louver 12 of each eye shade or lateral extension or each of the louvers if more than one louver is used in one eye shade, has a relatively sharp edge 25 at the intersection of the oblique outer surface 14 and the shoulder surface 17.

Inner wall 15 of the louver 12 and the corresponding wall 19 defining the rearmost of the louver openings 11 are generally parallel to one another and the outer wall 18 of the louver is generally parallel to the wall 20 defining the foremost of the louver openings. In a construction employing a plurality of the louvers 12 all of the corresponding inner or inwardly directed wall surfaces defining the several louver openings are generally parallel to one another and all of the corresponding outer or outwardly directed wall surfaces are parallel to one another. This parallelism of corresponding wall surfaces, besides providing a louver construction that is neat, strong and attractive in appearance, facilitates molding of the frame rings, eye shades and bridge of the goggles as a one-piece integral unit. The die or mold member used to define the inside surfaces of the eye shades 3 may be provided with projections or core pieces which extend in a forward direction to form the louver openings 11. Such mold member projections may also define the shoulders 17 and 24 on the louvers 12 and on the frame rings 2. The mating mold member which is used to define the outer surfaces of the eye shades 3 is suitably recessed to receive the projections on the inner mold section and is shaped to define the oblique surfaces 14 and 22 on the louvers and frame rings.

As a further feature of construction the inner surface 15 and the outer surface 18 of each louver 12 are parallel so that the louver is of substantially uniform thickness rearwardly of the shoulder 17.

The shades or side extensions 3 are each formed with an integral outwardly projecting flange 28 angularly disposed to the body of the shade and vertical slots 29 through flanges 28 receiving the ends of an elastic or molded rubber headband 30 by means of which the goggles are held in place on the wearer.

One end of the headband, such as the end shown at the left in Fig. 1, is formed and arranged as an adjustable loop so that the length of the headband can be altered as desired. The other end of the headband is formed with an integral enlargement 31 which in assembly is deformed and forced through the opening 29 in the provision of an interlock with the end of the eye shade as shown at the right in Fig. 1.

In describing my goggles I refer to one of the eyepieces by reference numerals, it being understood that the same description applies to the other eyepiece, one eyepiece being a reversed duplicate of the other. Corresponding parts and components of the two eyepieces are thus identified in the drawing by the same reference numerals.

Each of the relatively heavy sectioned rings 2 of the frame of the goggles is formed with an internal rabbet 32 that is continuous down straight substantially parallel side protions 33 and across oblique portions and horizontal bottom portions, 34 and 35, respectively, of the eye rings.

As shown in Fig. 1 the retainer ring 8 is L-shaped in section, having one flange or arm 40 of the section normal to the plane of the outwardly directed surface 48 of the lens and with an edge surface 47 disposed flatwise against a marginal portion of such lens surface to retain the lens in the eye ring rabbet.

As shown in Figs. 1 and 3, the rabbet 32 is of greater width than the lens thickness, so that flange 40 of the retainer ring 8 may be received within the frame ring 2 in interfitting relation, the two rings thus defining a continuous groove or channel 41 down the sides 33, oblique portions 34 and across the bottom 35 of the eye opening to receive the lens 10. The lens margin is thus confined between one wall surface 49 (Fig. 5) of the rabbet 32 and said edge surface 47 of the retainer ring; the other surface of the rabbet 32, normal to the plane of the lens, has a marginal portion engaged by and adhesively bonded to said one arm or flange 40 of the retainer ring. The other arm or flange 51 of the retainer ring 8 is disposed flatwise against an outwardly directed front or companion surface 52 (Fig. 5) of the eye ring in a plane disposed at an angle to the said other surface of the rabbet. Across the top of the eye opening the frame ring 2 is relieved or cut away in the provision of a slot to accommodate the lens 10, which lens is of greater size or height than the eye opening and projects above the top of the eye ring and the frame of the goggles in the provision of an exposed grip portion 37. A recess 38 is provided in one or both of the surfaces of the lens grip portion 37 to receive the thumb or fingernail of the user or wearer desiring to remove the lens for cleaning, as will later appear. The discontinuity of the rabbet 32 across the top of the frame provides an elongated horizontal slot 42 between the thick frame ring 2 and the retainer ring 8. By proportioning the dimensions of the several parts so that the thickness dimension of the lens 10 is slightly greater than the width of the groove or channel 41 in the eye ring the walls of the groove yieldingly grip the marginal edges of the lens to hold the latter in place in normal use while permitting withdrawal as desired through the slot 42 and as indicated by the broken lines in the figures.

Since each of the lenses projects above the top of a corresponding eye ring of the frame of the goggles, the user can easily remove and replace the lenses, or one of them, as desired, such removal and replacement of a lens, as for cleaning, being feasible while the goggle frame remains in place and attached to the head of the wearer.

As a further advantage of the arrangement described, this advantage being one of the principal objectives of the invention, a wiping action is obtained by so proportioning the thickness dimension of the lens in relation to the width of the withdrawal slot 42 that the top cross element 43 of the retainer ring 8 and the corresponding and confronting cross element of the frame ring 2, or one of them, move or wipe across the lens surfaces during the withdrawal and insertion of the latter from or into the eye ring. A positive wiping action is thus obtained when the slot width is slightly less than the thickness dimension of the lens, it being understood that, as shown in Fig. 7, the lens is of uniform thickness or substantially so across its entire width and throughout its entire height. In such an arrangement one or both of the top cross elements of the rings 2 and 8, being of deformable plastic material, may be deformed by the lens so as to maintain a positive wiping pressure against the lens which is effective in removing dust and moisture from the lens surfaces. As a still further refinement pertaining to this feature of the invention, the top elements of the frame and retainer rings, or one of them, carry or may be formed with one or more relatively thin wiping elements such as rounded edge elements 39 on the ring 2 or the tapered section elements illustrated at 44 and 45 on the ring 8. These wiping elements are either separately formed and bonded in place or preferably and as shown are integral with the top elements of the rings. The wipers extend across the entire width of the lens opening from side to side of the eye ring and each has a laterally flexible and deformable marginal portion terminating in an edge 46 which bears against the surface of the lens in providing the wiping action desired and referred to above. Thus the retainer ring 8, one of the rings defining the eye opening is disposed wholly on the outside of the lens 10 and its top element 43 engages the outside surface 48 of the lens as a wiper. The other or frame ring 2 has its top element disposed wholly on the inside of the lens and engages inside surface 53 of the lens as a wiper. The top element 43 of the retainer ring and the top element of the frame ring 2, on the outside and inside, respectively, of the lens, constitute the sole connections between the upper ends of the straight side portions of their respective rings, which side portions define and form the walls of lens receiving grooves and which hold the lens in place.

Although a single thin wiping element may be employed on the cross element of the eye ring in lieu of the several shown, the multiple wiping action obtained by the plural tapered section wipers is preferred. The relatively divergent character of the two tapered wipers 44 and 45 results in the wipers being slightly spread apart by the pressure of the lens so that the latter is securely held in place. The divergence of the two companion wipers also provides an improved wiping action, the lower wiper 45 being of principal effect during the withdrawal of the lens and the upper wiper 44 being of principal effect during insertion of the lens.

In making the frame of the goggles, comprising the rings 2, the eye shields or shades 3 and the bridge 1, a resin or plastic such as polyethylene of relatively soft character is employed while the retainer rings 8 may be made of either the same soft plastic or, preferably, of a relatively hard or stiff plastic or resin. This combination of soft plastic for the frame and shade portions and hard or stiff plastic for the retainer ring portions results in a structure having the eye shield margins 4 and 5 which yield to localized pressure. The fit of the goggles is thereby enhanced since the margins or edges 4 and 5 may deform slightly when pressed against the face of the wearer. So that this face conforming characteristic may be coupled with reasonable strength and tear resistance, the shield edges 4 and 5 are relatively thickened in the provision of continuous beads 59 which extend onto and around the headband attaching flanges 28. Although the preferred arrangement thus employs retainer rings 8 of a different or stiffer plastic composition than that employed in the frame rings 2, it is feasible to make the retainer rings of the same plastic composition or even of a softer composition than that used for the frame ring and eye shade portions of the goggles.

To locate the retainer rings 8 in place in the frame rings 2, the retainers are each flanged in the provision of a radial shoulder 46 which is received against the corresponding frame ring 2 when the body of the retainer is inserted in the rabbet 32 of the frame ring. The parts are adhered together as by a suitable plastic cement or adhesive applied at the time of assembly. It is also feasible, of course, to employ one-piece eye rings in which the retainer ring 8 is integral with the frame ring 2, the lens groove 41 and the slot 42 being either cut, machined, or formed in the original molding operation as by means of suitable cores.

In the description of the invention and the definition thereof in the claims, reference is made to plastics and plastic materials, it being understood that such terms refer to the plastic materials having the requisite toughness and relative deformability mentioned and commonly used and well known in the art and are not limited to the specific plastics and resins previously identified herein. In addition to plastics as commonly understood in the art, the rubbers and rubbery resins and copolymers are also intended to be used in the construction of the goggles of the present invention. The transparent lenses 10, although specified as being formed of conventional hard transparent plastics, can also be made of glass and glass substitutes. Goggles to be used in situations giving rise to the accumulation on the lenses of relatively hard particles such as emery dust and the like are preferably supplied with lenses of extremely hard flint glass, which more effectively resist abrasion and scratching when drawn through the slots 42 during removal and replacement.

In utilizing goggles of the type described, the wearer can quickly and easily cleanse the lenses by merely withdrawing the lenses from the eye rings, using the protruding grip portions 37 for finger holds. These integral top extensions on the lenses permit the user to locate and obtain a direct grip of the lenses so that the latter can be withdrawn, cleansed as by rinsing or wiping and replaced without removing the goggles. In a situation calling for washing of the lenses after removal, in lieu of simply wiping with a dry cloth or the like, the reinsertion of the lenses into the eye rings or lens frames obtains a squeegee-like wiping of the lens surface or surfaces, the water or other washing liquid being effectively wiped off the lens surfaces by the cross elements of the frame ring 2 and the retainer ring 8, particularly by the upper tapered wiper 44 of the latter. If, as shown, the thin knife-like wiping edges are provided on only one of the cross elements of the eye ring, it is feasible to remove, reverse and reinsert the lens to obtain the squeegee wiping action on both sides.

In accordance with the patent statutes the principles of the present invention may be utilized in various ways, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. A goggle construction comprising an eye ring formed with an internal lens receiving groove, the eye ring also being formed with an elongated slot registering with the groove, a lens larger than the eye ring removably received in the groove and projecting through the slot, and a wiping element of thin flexible material carried by the eye ring and disposed to engage and make substantially line contact with a received lens, the projecting portion of the lens constituting a grip by means of which the lens is held and manipulated in removing it from and replacing it in the eye ring.

2. A goggle construction comprising an eye ring formed with an internal lens receiving groove, the eye ring also being formed with an elongated slot registering with the groove, and a lens removably received in the groove, said eye ring including a thin edged wiping element disposed along the slot and adapted to engage a lens during insertion of the latter through the slot, and the wiping element being relatively flexible and making substantially line contact with the engaged lens surface to move relatively across the latter in a wiping action during lens insertion.

3. A goggle construction comprising an eye ring formed with an internal lens receiving groove, the eye ring also being formed with an elongated slot registering with the groove, and a lens larger than the eye ring removably received in the groove and projecting through the slot, the projecting portion of the lens constituting a grip by means of which the lens is held and manipulated in removing it from and replacing it in the eye ring, said eye ring including a thin edged wiping element disposed along the slot and adapted to engage a lens during insertion of the latter through the slot, and the wiping element being relatively flexible and making substantially line contact with the engaged lens surface to move relatively across the latter in a wiping action during lens insertion.

4. A goggle construction comprising an eye ring formed with an internal lens receiving groove, the eye ring also being formed with an elongated slot registering with the groove, a lens removably received in the groove and a wiping element of thin flexible material carried by the eye ring and disposed to engage and make substantially line contact with a received lens.

5. A goggle construction comprising frame means, a lens, means mounting the lens in the frame means for facile removal and replacement, and a thin edged wiping element of relatively flexible material carried by the frame means and disposed to make substantially line contact with one face of the lens to move relatively across the lens face in a wiping action during removal or replacement of the lens.

6. A goggle construction comprising interfitted frame and retainer rings forming an eye ring having a lens groove with the frame ring on one side of the groove and the retainer ring on the other side of the groove, the eye ring being formed with a slot communicating with the lens groove, a lens mounted in the groove for facile removal and replacement through the slot, and a thin edged wiping element of relatively flexible material carried by one of the rings and disposed to engage and make substantially line contact with a lens and to move relatively across the lens in a wiping action during removal or replacement of the lens through the slot.

7. A goggle construction comprising interfitted frame and retainer rings forming an eye ring having a lens groove with the frame ring on one side of the groove and the retainer ring on the other side of the groove, the eye ring being formed with a slot communicating with the lens groove, a lens mounted in the groove for facile removal and replacement through the slot, and the retainer ring being formed with an integral flange extending along the slot, said flange having a relatively thin flexible and yieldable edge engageable with the surface of the lens to wipe the latter during removal and replacement.

8. A goggle comprising a frame having a lens receiving groove and an elongated slot in the plane of the groove, a lens insertable in the frame and withdrawable therefrom through the slot, the lens having an edge receivable in the groove for locating and supporting the lens in the frame, and a thin edged wiping element of relatively flexible yieldable material carried by the frame and disposed along the slot, the lens being of such thickness and being so guided by the frame during insertion and withdrawal that the thin edge of the wiping element is deformed by the lens and moves relatively across the lens in a wiping action.

9. A goggles construction comprising in combination frame means including an eye ring of top, bottom and side elements defining an opening, a lens in the eye ring opening, said lens having oppositely directed front and rear side surfaces and a peripheral edge, the side elements of the eye ring each having a rabbet with intersecting wall surfaces, one such wall surface of each rabbet engaging the peripheral edge of the lens, another such wall surface engaging a marginal portion of one side surface of the lens, the top element of the eye ring having ends joined to the side elements at points spaced substantially the maximum width dimension of the lens, the rabbets in the side elements having terminal upper ends at the juncture points of the top and side elements, said top element of the eye ring being disposed wholly on and extending across said one side of the lens, a retainer ring disposed against marginal portions of the other side surface of the lens, said retainer ring being received against said one of the intersecting wall surfaces of each of the eye ring rabbets, said retainer ring including a top element disposed against and extending across said other side of the lens between said spaced points, said top element of the retainer ring being the sole connection extending across said other side of the lens between said points, and the lens being removable from and replaceable in the eye ring by movement in the plane of the opening through a slot defined by the top element of the eye ring and the top element of the retainer ring.

10. A goggles construction comprising in combination molded frame means of relatively soft deformable plastic composition, said frame means including an eye ring of top, bottom and side elements defining an opening, a lens in the eye ring opening, said lens having oppositely directed side surfaces and a peripheral edge, the side elements of the eye ring each having a rabbet with intersecting wall surfaces, one such wall surface of each rabbet engaging the peripheral edge of the lens, another such wall surface engaging a marginal portion of one side surface of the lens, the top element of the eye ring having ends joined to the side elements at points spaced substantially the maximum width dimension of the lens, the rabbets in the side elements having terminal upper ends at the juncture points of the top and side elements, said top element of the eye ring being disposed wholly on and extending across said one side of the lens, a molded retainer ring of relatively hard stiff plastic composition disposed against marginal portions of the other side surface of the lens, said retainer ring being received against said one of the intersecting wall surfaces of each of the eye ring rabbets, said retainer ring including a top element disposed against and extending across said other side of the lens between said spaced points, said top element of the retainer ring being the sole connection extending across said other side of the lens between said points, and the lens being removable from and replaceable in the eye ring by movement in the plane of the opening through a slot defined by the top element of the eye ring and the top element of the retainer ring.

11. A goggles construction comprising in combination frame means of deformable plastic composition, said frame means including an eye ring of top, bottom and side elements defining an opening, a lens in the eye ring opening, said lens having oppositely directed side surfaces and a peripheral edge, the side elements of the eye ring each having a rabbet with intersecting wall surfaces one such wall surface of each rabbet engaging the peripheral edge of the lens another such wall surface engaging a marginal portion of one side surface of the lens, the top element of the eye ring having ends joined to the side elements at points spaced substantially the maximum width dimension of the lens, the rabbets in the side elements having terminal upper ends at the juncture points of the top and side elements, said top element of the eye ring being disposed wholly on and extending across said one side of the lens, a retainer ring disposed against marginal portions of the other side surface of the lens, said retainer ring being received against said one of the intersecting wall surfaces of each of the eye ring rabbets, said retainer ring including a top element disposed against and extending across said other side of the lens between said spaced points, said top element of the retainer ring being the sole connection extending across said other side of the lens between said points, said top and side elements of the rings being substantially straight, the top elements having substantially right angle intersections with the upper ends of the side elements of the respective rings, and the lens being removable from and replaceable in the eye ring by movement in the plane of the opening through a slot defined by the top elements of the rings.

12. A goggles construction comprising ring means of relatively soft deformable yielding plastic composition having top, bottom and side element means integrally joined to define a lens receiving opening, the side element means comprising a pair of spaced elements parallel to one another and formed with confronting parallel lens receiving grooves, the top element means being formed with an elongated slot continuous and registering with the grooves of the side element means, a lens mounted in the ring means, said lens being formed of relatively hard material and having spaced parallel side edges slidably received and guided in the grooves of the side element means, said lens being removable from and insertable into the ring means through the top slot by ordinary manual action, and the grooves of the side element means being proportioned with respect to the thickness dimension of the lens for yielding gripping of the lens by the walls of the grooves to retain the lens in the ring in normal use while permitting such manual withdrawal and replacement as desired against the frictional restraint of such gripping by edgewise movement of the lens through the elongated slot and in the plane of the lens opening.

References Cited in the file of this patent

UNITED STATES PATENTS

| | | |
|---|---|---|
| 1,168,581 | Troppman | Jan. 18, 1916 |
| 1,322,834 | Shindel | Nov. 25, 1919 |
| 1,651,488 | Tully | Dec. 6, 1927 |
| 1,916,630 | Moran et al. | July 4, 1933 |
| 1,986,688 | Thiele | Jan. 1, 1935 |
| 2,342,766 | Stiano | Feb. 29, 1944 |
| 2,364,584 | Malcom | Dec. 5, 1944 |
| 2,388,205 | Bernheim et al. | Oct. 30, 1945 |
| 2,430,881 | Lehmberg | Nov. 18, 1947 |